(12) United States Patent
Yamamoto

(10) Patent No.: US 11,223,709 B2
(45) Date of Patent: Jan. 11, 2022

(54) EXCHANGE, COMMUNICATION SYSTEM, REGISTRATION METHOD, AND PROGRAM

(71) Applicant: NEC Platforms, Ltd., Kawasaki (JP)

(72) Inventor: Hiroyo Yamamoto, Kawasaki (JP)

(73) Assignee: NEC Platforms, Ltd., Kanagawa (JP)

( * ) Notice: Subject to any disclaimer, the term of this patent is extended or adjusted under 35 U.S.C. 154(b) by 0 days.

(21) Appl. No.: 16/762,960

(22) PCT Filed: Oct. 7, 2019

(86) PCT No.: PCT/JP2019/039526
§ 371 (c)(1),
(2) Date: May 11, 2020

(87) PCT Pub. No.: WO2020/090364
PCT Pub. Date: May 7, 2020

(65) Prior Publication Data
US 2021/0195002 A1 Jun. 24, 2021

(51) Int. Cl.
*G06F 15/173* (2006.01)
*H04L 29/14* (2006.01)
*H04L 29/06* (2006.01)
*H04L 29/08* (2006.01)

(52) U.S. Cl.
CPC ............ *H04L 69/40* (2013.01); *H04L 65/105* (2013.01); *H04L 65/1053* (2013.01); *H04L 65/1073* (2013.01); *H04L 67/26* (2013.01)

(58) Field of Classification Search
CPC ... H04L 69/40; H04L 65/105; H04L 65/1053; H04L 65/1073; H04L 67/26
See application file for complete search history.

(56) References Cited

U.S. PATENT DOCUMENTS

2010/0217852 A1 8/2010 Nishida
2012/0128135 A1* 5/2012 Sun ................... H04L 65/1053
379/27.01

(Continued)

FOREIGN PATENT DOCUMENTS

CN 102223248 A 10/2011
CN 102684895 A 9/2012

(Continued)

OTHER PUBLICATIONS

International Search Report for PCT/JP2019/039526 dated Nov. 19, 2019 (PCT/ISA/210).

(Continued)

*Primary Examiner* — Wing F Chan
*Assistant Examiner* — Joseph R Maniwang
(74) *Attorney, Agent, or Firm* — Sughrue Mion, PLLC

(57) ABSTRACT

An exchange capable of, when a failure occurs, preventing a service from deteriorating without requiring an operation performed by a user is provided. An exchange (1) includes a notification control unit (2) configured to, when the exchange enters an operating state, request a server apparatus to transmit a notification for making a predetermined application installed in a communication terminal registered in the server apparatus register the application in the exchange, and a terminal control unit (3) configured to register the predetermined application in the exchange.

12 Claims, 5 Drawing Sheets

(56) References Cited

U.S. PATENT DOCUMENTS

| | | | | |
|---|---|---|---|---|
| 2012/0157098 A1* | 6/2012 | Singh | ................ | H04L 65/1069 |
| | | | | 455/435.1 |
| 2012/0320736 A1* | 12/2012 | Hillier | ................ | H04M 7/0084 |
| | | | | 370/218 |
| 2013/0303164 A1 | 11/2013 | Seo | | |
| 2015/0254726 A1 | 9/2015 | Cassidy et al. | | |

FOREIGN PATENT DOCUMENTS

| | | |
|---|---|---|
| CN | 102685341 A | 9/2012 |
| CN | 103023678 A | 4/2013 |
| CN | 105009526 A | 10/2015 |
| CN | 105940656 A | 9/2016 |
| CN | 108430116 A | 8/2018 |
| EP | 1689147 A2 | 8/2006 |
| JP | 10-320323 A | 12/1998 |
| JP | 2002-344529 A | 11/2002 |
| JP | 2007-312227 A | 11/2007 |
| JP | 2010-200114 A | 9/2010 |
| JP | 2015-103031 A | 6/2015 |
| JP | 2015-162895 A | 9/2015 |
| JP | 2018-014694 A | 1/2018 |

OTHER PUBLICATIONS

Communication dated Nov. 10, 2020, from the European Patent Office in European Application No. 19880318.1.
Chinese Office Action for CN Application No. 201980006048.4 dated Feb. 5, 2021 with English Translation.

\* cited by examiner

EXCHANGE, COMMUNICATION SYSTEM, REGISTRATION METHOD, AND PROGRAM

CROSS REFERENCE TO RELATED APPLICATIONS

This application is a National Stage of International Application No. PCT/JP2019/039526 filed Oct. 7, 2019, claiming priority based on Japanese Patent Application No. 2018-202666 filed Oct. 29, 2018, the disclosure of which is incorporated herein in its entirety by reference.

TECHNICAL FIELD

The present disclosure relates to an exchange, a communication system, a registration method, and a program.

BACKGROUND ART

In recent years, owing to the spread of communication terminals such as smartphones, PUSH notifications in which, by triggers by servers, messages are transmitted to communication terminals have been widely used in order to effectively notify users of updates of information or the like (e.g., Patent Literature 1).

The PUSH notifications are used, for example, for a notification of an incoming call in a voice communication service in conformity with the VoIP (Voice over Internet Protocol), a notification of information for an SNS (Social Networking Service), and the like. For example, in the case of the voice communication service in conformity with the VoIP, when an incoming call occurs in a communication terminal of which a user subscribes to a service, an exchange provided by a service provider transmits a notification of the incoming call to a server apparatus that transmits a message. The server apparatus transmits a notification of the incoming call to the communication terminal in which the incoming call has occurred.

Assume a voice communication service in conformity with the VoIP (Voice over Internet Protocol) as an example case. A service provider provides a voice communication application (hereinafter also referred to as a telephone application) to a user so that the user can use the voice communication service. The user installs the provided telephone application in a communication terminal used by the user. When the telephone application is registered in an exchange, the user can perform voice communication (an outgoing call, an incoming call, and a telephone conversation) by using the telephone application.

CITATION LIST

Patent Literature

Patent Literature 1: Japanese Unexamined Patent Application Publication No. 2015-162895

SUMMARY OF INVENTION

Technical Problem

It should be noted that a service provider forms a redundant configuration by using a plurality of exchanges in order to continue a service even when a failure occurs. One of the plurality of exchanges operates as an active exchange (operating exchange) and provides services to applications installed in communication terminals. Meanwhile, exchanges other than the active exchange operate as standby exchanges when the active exchange is in a normal state. However, when a failure occurs in the active exchange and it becomes inoperable, one of the standby exchanges operates as the active exchange.

Further, some of the communication terminals change operating states of applications installed in them from foreground states to background states when the applications are in standby states where they are not used. These transitions are made in order to reduce the consumptions of batteries and to reduce the traffic. The application that has entered the background state becomes a sleep state. That is, some communication terminals stop the operations of applications that have entered the background state.

Note that when a failure occurs in the active exchange and an standby exchange operates as a new active exchange, it is necessary that an application through which a service is provided be previously registered in the new active exchange so that the new active exchange can provide the service. As a user operates an application in a sleep state among applications through which services are provided, the application enters an active state, so that the application can be registered in the new active exchange.

However, when the user does not operate the application in the sleep state, the application remains in the sleep state, so that the application cannot be registered in the new active exchange. Therefore, even if the new active exchange attempts to make a notification of an incoming call and a notification of information to the application, it cannot send the notification of the incoming call and the notification of the information because the application is not registered in the new active exchange itself, thus causing a deterioration of the service.

The present disclosure has been made to solve the above-described problem and one of the objects thereof is to provide an exchange, a communication system, a registration method, and a program capable of, when a failure occurs, preventing a service from deteriorating without requiring an operation performed by a user.

Solution to Problem

An exchange according to the present disclosure includes:
a notification control unit configured to, when the exchange enters an operating state, request a server apparatus to transmit a notification for making a predetermined application installed in a communication terminal registered in the server apparatus register the application in the exchange; and
a terminal control unit configured to register the predetermined application in the exchange.

A communication system according to the present disclosure includes:
the above-described exchange; and
a server apparatus, in which
the server apparatus makes the notification to the predetermined application through another server apparatus in response to a request from the exchange.

A registration method according to the present disclosure includes:
requesting, when an own exchange enters an operating state, a server apparatus to transmit a notification for making a predetermined application installed in a communication terminal registered in the server apparatus register the application in the own exchange; and
registering the predetermined application in the own exchange.

A registration program according to the present disclosure is a registration program for causing a computer to:

request, when an own exchange enters an operating state, a server apparatus to transmit a notification for making a predetermined application installed in a communication terminal registered in the server apparatus register the application in the own exchange; and register the predetermined application in the own exchange.

Advantageous Effects of Invention

According to the present disclosure, it is possible to provide an exchange, a communication system, a registration method, and a program capable of, when a failure occurs, preventing a service from deteriorating without requiring an operation performed by a user.

DESCRIPTION OF EMBODIMENTS

Example embodiments according to the present disclosure will be described hereinafter with reference to the drawings. For clarifying the explanation, the following descriptions and the drawings are partially omitted and simplified as appropriate. The same symbols are assigned to the same elements throughout the drawings, and redundant explanations are omitted as necessary.

First Example Embodiment

Figure 1:
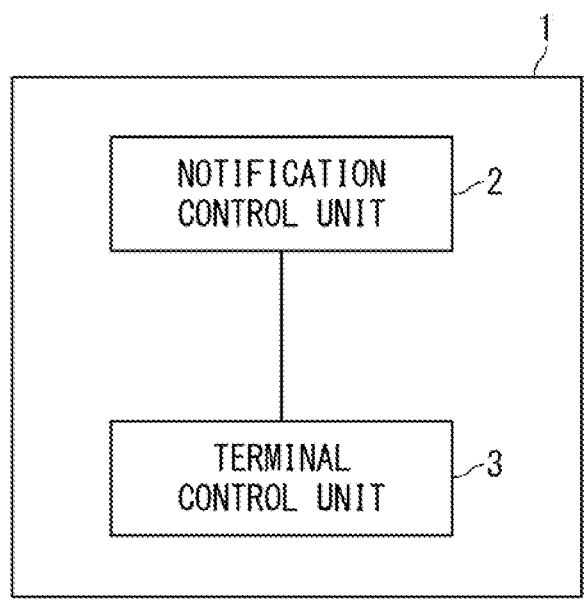
FIG. 1 shows an outline of a communication apparatus according to a first example embodiment.

A first example embodiment will be described with reference to FIG. 1. FIG. 1 shows an outline of an exchange 1 according to a first example embodiment.

The exchange 1 is a communication apparatus that provides a service to a predetermined application installed in a communication terminal (not shown) registered in the exchange 1. The exchange 1 is configured so as to be redundant with other exchanges (not shown). In the case where another exchange operates as an active exchange and the exchange 1 operates as a standby exchange, for example, when a failure occurs in the active exchange, the exchange 1 changes from the standby exchange to an active exchange, enters an operating state, and operates as the active exchange.

The exchange 1 includes a notification control unit 2 and a terminal control unit 3.

For example, the notification control unit 2 requests, when a failure occurs in the active exchange and hence the exchange 1 enters an operating state, a server apparatus (not shown) to transmit a notification for making a predetermined application installed in a communication terminal registered in the server apparatus register the application in the exchange 1.

In response to this request, the server apparatus transmits the aforementioned notification to the predetermined application installed in the communication terminal registered in the server apparatus. The aforementioned notification is a notification which the predetermined application can receive even when the predetermined application is in a sleep state. When the application receives the notification in the sleep state, it enters an active state and performs a registration process for the exchange 1.

The predetermined application may be, for example, a voice communication application such as a voice call, VoIP, or a video call, or a data communication application such as an email or an SMS (Short Message Service). Alternatively, the predetermined application may be, for example, a business application, a game application, or a moving-picture distribution application.

The terminal control unit 3 registers the predetermined application installed in the communication terminal, which has received the notification, in the exchange 1. That is, the terminal control unit 3 registers the predetermined application installed in the communication terminal registered in the server apparatus in the exchange 1.

As described above, the exchange 1 requests, when the exchange 1 enters an operating state, the server apparatus to transmit a notification for making a predetermined application installed in a communication terminal registered in the server apparatus register the application in the exchange 1. In response to this request, the server apparatus transmits the notification for making the predetermined application register the application in the exchange 1. The exchange 1 registers the predetermined application, which has received the notification, in the exchange 1. That is, the exchange 1 makes the server apparatus transmit a notification for requesting, even when the predetermined application is in a sleep state, the application to enter an active state and register the application in the exchange 1. In other words, the exchange 1 makes the predetermined application in the sleep state enter the active state without requiring an operation performed by a user. Further, since the exchange 1 registers the predetermined application in the exchange 1, the exchange 1 can correctly make a notification of an incoming call, a notification of information, and the like. Therefore, the exchange 1 prevents a service from deteriorating without requiring an operation performed by a user even when a failure occurs in the active exchange. Therefore, by using the exchange 1 according to the first example embodiment, it is possible to, when a failure occurs, prevent a service from deteriorating without requiring an operation performed by a user.

Second Example Embodiment

Next, a second example embodiment will be described. The second example embodiment is an example embodiment that is equivalent to the first example embodiment but described in a more detailed manner.

Example of Configuration of Communication System

Figure 2:
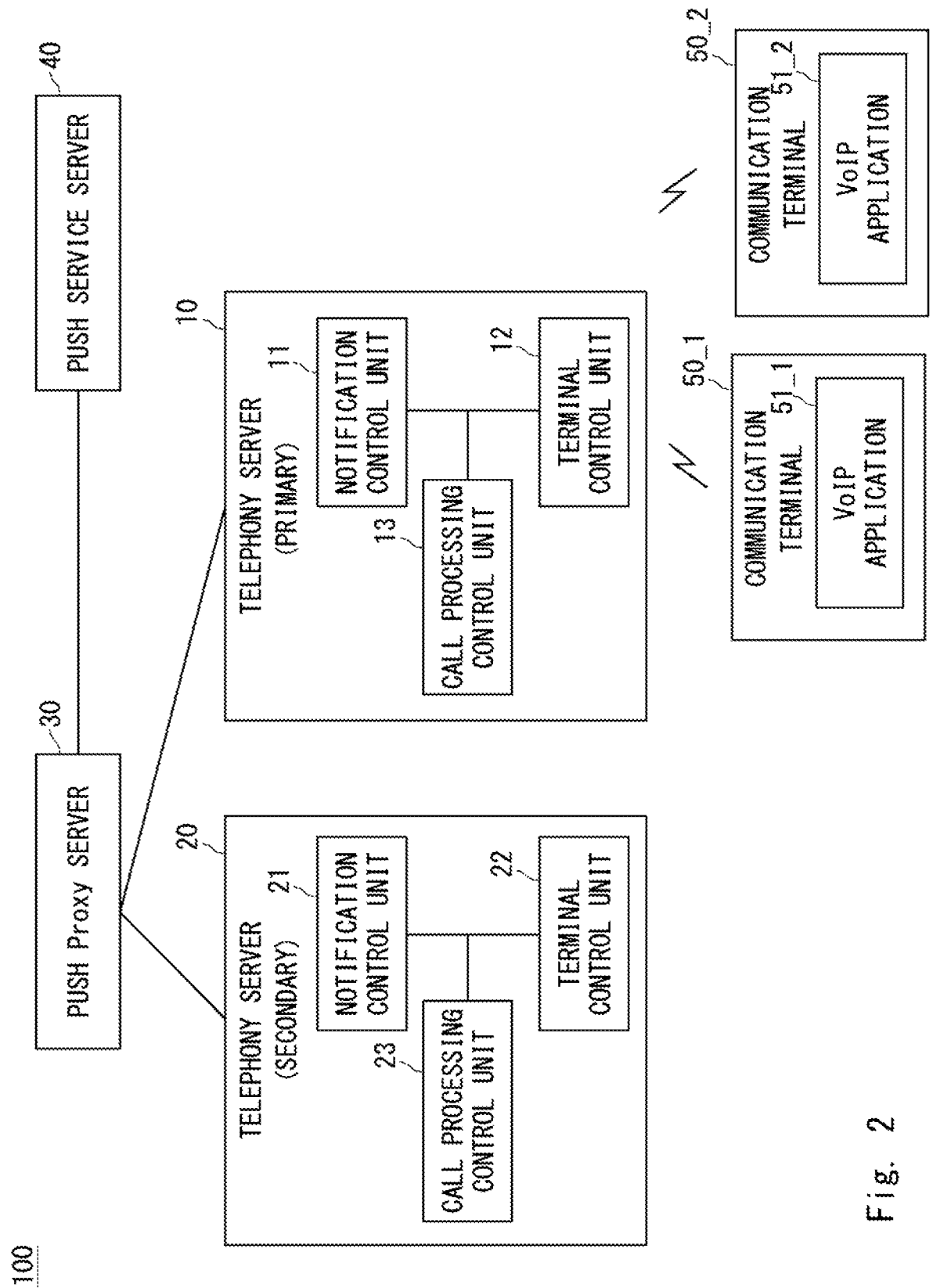
FIG. 2 shows an example of a configuration of a communication system according to a second example embodiment.

An example of a configuration of a communication system 100 according to the second example embodiment will be described with reference to FIG. 2. FIG. 2 is a diagram showing an example of a configuration of a communication system according to the second example embodiment. The communication system 100 is a communication system that provides services to communication terminals. Note that in the following description is give on the assumption that a service provided to a communication terminal is a voice communication service in conformity with the VoIP. That is, the communication system 100 is a communication system that provides a voice communication service to a communication terminal.

The communication system 100 includes a telephony server 10, a telephony server 20, a PUSH Proxy server 30, a PUSH service server 40, and communication terminals 50_1 and 50_2.

The telephony servers 10 and 20 correspond to the exchange 1 in the first example embodiment. Each of the telephony servers 10 and 20 is a telephone exchange (a private branch exchange) that provides voice communication services in conformity with the VoIP to the communication terminals 50_1 and 50_2. Each of the telephony servers 10 and 20 connects an outside line coming from a public network to either of the communication terminals 50_1 and 50_2, and connects an outside line coming from either of the communication terminals 50_1 and 50_2 to a communication terminal at a destination located in the public network. Further, each of the telephony servers 10 and 20 provides, for example, an extension function between the communication terminals 50_1 and 50_2. The telephony servers 10 and 20 may also be referred to as PBXs (Private Branch Exchanges).

Each of the telephony servers 10 and 20 conforms to the SIP (Session Initiation Protocol), and connects to and communicates with the communication terminals 50_1 and 50_2, VoIP applications 51_1 and 51_2, and the PUSH Proxy server 30 according to the SIP.

The telephony servers 10 and 20 are configured so as to be redundant with each other. The telephony server 10 is a primary telephony server and the telephony server 20 is a secondary telephony server. That is, the telephony server 10 is an active exchange and the telephony server 20 is an auxiliary exchange. Note that the telephony server 20 may also be referred to as a standby exchange.

The secondary telephony server 20 periodically or non-periodically performs alive-monitoring for the primary telephony server 10 and thereby monitors whether or not the telephony server 10 is operating normally. When a failure occurs in the telephony server 10, the telephony server 20 changes from the secondary telephony server to the primary telephony server and operates as the primary telephony server.

When the telephony server 20 operates as the primary telephony server, the telephony server 10, which operates as the secondary telephony server, periodically or non-periodically performs alive-monitoring for the telephony server 20 and thereby monitors whether or not the telephony server 20 is operating normally. When a failure occurs in the telephony server 20, the telephony server 10 changes from the secondary telephony server to the primary telephony server and operates as the primary telephony server.

Note that the telephony server 10 operating as the primary telephony server may periodically or non-periodically notify the telephony server 20 operating as the secondary telephony server that the telephony server itself is operating normally. In this way, the telephony server 20 operating as the secondary telephony server can, all the same, determine whether or not a failure has occurred in the telephony server 10 operating as the primary telephony server.

The telephony servers 10 and 20 may have the same configuration as each other or configurations different from each other, as long as each of them includes the later-described function unit. The following description is given on the assumption that the telephony servers 10 and 20 have the same configuration as each other, and redundant descriptions will be omitted as appropriate.

Further, although the communication system 100 includes only two telephony servers, it may include three or more telephony servers. In such a case, one of a plurality of telephony servers operates as the primary telephony server and the other telephony servers operate as secondary telephony servers. Then, when a failure occurs in the primary telephony server, one of the secondary telephony servers changes to the primary telephony server.

A PBX-id (identifier), which is identification information for identifying an apparatus, is set in each of the telephony servers 10 and 20. The same PBX-id is set in both of the telephony servers 10 and 20.

The telephony server 10, which is the primary telephony server, connects to and communicates with the VoIP application 51_1 installed in the communication terminal 50_1. The telephony server 10 connects to and communicates with the VoIP application 51_2 installed in the communication terminal 50_2.

When the telephony server 10 receives registration request messages from the VoIP applications 51_1 and 51_2, it registers the VoIP applications 51_1 and 51_2 in the telephony server 10. That is, when the telephony server 10 receives registration request messages from the VoIP applications 51_1 and 51_2, it registers the VoIP applications 51_1 and 51_2 in the telephony server 10 and thereby makes them belong to the telephony server 10.

When a VoIP application is installed in a communication terminal for the first time, the telephony server 10 performs the above-described registration process and requests the PUSH Proxy server 30 to make an Endpoint registration. Note that in the following description, when a VoIP application is installed for the first time, it may also be referred to as an initial registration.

The Endpoint registration means associating identification information for identifying a communication terminal in which a VoIP application for which a PUSH notification is performed is installed with a PBX-id of the telephony server 10 and registering them in the PUSH Proxy server 30. The identification information for identifying a communication terminal may be, for example, a device token or an ID for identifying the communication terminal. Note that the following description is given on the assumption that the identification information for identifying a communication terminal is a device token.

For example, when the VoIP application 51_1 is installed in the communication terminal 50_1 for the first time, the telephony server 10 receives a registration request including a device token of the communication terminal 50_1 from the VoIP application 51_1. Then, the telephony server 10 registers the device token of the communication terminal 50_1 in the telephony server 10 and requests the PUSH Proxy server 30 to make an Endpoint registration.

Further, when the telephony server 10 performs a PUSH notification to the VoIP applications 51_1 and 51_2, such as when making a notification of an incoming call or the like, the telephony server 10 requests the PUSH Proxy server 30 to transmit the PUSH notification.

In the above description, the description of the telephony server 10 is a description of the configuration (the operations) of the telephony server operating as the primary telephony server. When the telephony server 20 is the primary telephony server, the telephony server 20 performs the above-described operations.

The PUSH Proxy server 30 corresponds to the server apparatus in the first example embodiment. The PUSH Proxy server 30 is a server apparatus disposed on the Internet. The PUSH Proxy server 30 receives a request for an Endpoint registration from the telephony server 10. As the Endpoint registration, the PUSH Proxy server 30 associates the PBX-id of the telephony server 10 with the device token of the communication terminal in which the VoIP application for which the Endpoint registration is made is installed and registers them.

Further, when the PUSH Proxy server 30 receives a request to transmit a PUSH notification from the telephony server 10, it transmits a PUSH notification request for requesting the PUSH notification to the PUSH service server 40. The PUSH notification request is a message for requesting a PUSH notification for the VoIP application installed in the communication terminal to which the PUSH notification is transmitted. The PUSH Proxy server 30 incorporates the device token of the communication terminal for which the PUSH notification is performed into the PUSH notification request and transmits the PUSH notification request to the PUSH service server 40.

The PUSH service server 40 is a server apparatus that performs, in response to the PUSH notification request sent from the PUSH Proxy server 30, a PUSH notification for the communication terminal having the device token included in the PUSH notification request. The PUSH notification is a notification performed in an OS (Operation System) level of the communication terminal, and for performing an event notification for an application installed in the communication terminal in a PUSH manner.

The communication terminals 50_1 and 50_2 correspond to the communication terminal in the first example embodiment. Each of the communication terminals 50_1 and 50_2 may be, for example, a smartphone terminal, a tablet terminal, or the like. Note that the communication system 100 includes two communication terminals 50_1 and 50_2. However, the communication system 100 may include at least one communication terminal.

The VoIP application 51_1 is installed in the communication terminal 50_1. Further, the VoIP application 51_2 is installed in the communication terminal 50_2. When the VoIP applications 51_1 and 51_2 are in a standby state where they are not used, the communication terminals 50_1 and 50_2 change the operating states of the VoIP applications 51_1 and 51_2 to background states.

The communication terminals 50_1 and 50_2 are configured so that the OSs of the communication terminals 50_1 and 50_2 can receive a PUSH notification from the PUSH service server 40. When the communication terminals 50_1 and 50_2 receive the PUSH notification from the PUSH service server 40, they notify the VoIP applications 51_1 and 51_2 of the reception thereof. When the VoIP applications 51_1 and 51_2 are in a sleep state, the communication terminals 50_1 and 50_2 change their operating states from the sleep state to an active state and notify the VoIP applications 51_1 and 51_2 of the PUSH notification.

The VoIP applications 51_1 and 51_2 correspond to the predetermined application in the first example embodiment. Each of the VoIP applications 51_1 and 51_2 is voice communication application software that provides an IP (Internet Protocol) telephone function. The VoIP applications 51_1 and 51_2 connect to and communicate with the primary telephony server 10. Note that when the telephony server 20 operates as the primary telephony server, the VoIP applications 51_1 and 51_2 connects to and communicates with the telephony server 20.

The VoIP applications 51_1 and 51_2 can connect to and communicate with the PUSH service server 40. When the VoIP application 51_1 is installed in the communication terminal 50_1, the VoIP application 51_1 acquires the device token of the communication terminal 50_1 from the PUSH service server 40. Similarly, when the VoIP application 51_2 is installed in the communication terminal 50_2, the VoIP application 51_2 acquires the device token of the communication terminal 50_2 from the PUSH service server 40.

When the VoIP applications 51_1 and 51_2 perform a registration process with the telephony server 10, they transmit a registration request message including the acquired device token to the telephony server 10 and thereby register the device token in the telephony server 10.

Example of Configuration of Telephony Server

Next, an example of configurations of the telephony servers 10 and 20 will be described. Note that as described above, it is assumed that the telephony servers 10 and 20 have the same configuration as each other in this example embodiment. Therefore, an example of a configuration of the telephony server will be described by using the telephony server 10.

The telephony server 10 includes a notification control unit 11, a terminal control unit 12, and a call processing control unit 13. The telephony server 20 includes a notification control unit 21, a terminal control unit 22, and a call processing control unit 23. The notification control unit 21, the terminal control unit 22, and the call processing control unit 23 are functional units having configurations similar to those of the notification control unit 11, the terminal control unit 12, and the call processing control unit 13, respectively.

The notification control unit 11 corresponds to the notification control unit 2 according to the first example embodiment. When the terminal control unit 12 receives a registration request message from a VoIP application, the notification control unit 11 determines whether or not an Endpoint registration needs to be made in the PUSH Proxy server 30. When the Endpoint registration needs to be made, the notification control unit 11 requests the PUSH Proxy server 30 to make the Endpoint registration.

For example, assume that the VoIP application 51_1 has been installed in the communication terminal 50_1 for the first time and the terminal control unit 12 (which will be described later) has received a registration request message including the device token of the communication terminal 50_1 from the VoIP application 51_1. Then, the VoIP application 51_1 performs a registration process with the later-described terminal control unit 12. The notification control unit 11 acquires the device token of the communication terminal 50_1, which has been received from the VoIP application 51_1, from the terminal control unit 12. The notification control unit 11 determines whether or not the Endpoint registration for the VoIP application 51_1 is already made in the PUSH Proxy server 30.

Specifically, the notification control unit 11 determines whether or not the device token of the communication terminal 50_1 included in the registration request message received from the VoIP application 51_1 is already registered in the PUSH Proxy server 30.

The notification control unit 11 transmits the PBX-id of the telephony server 10 and the device token of the communication terminal 50_1 to the PUSH Proxy server 30, and thereby requests the PUSH Proxy server 30 to check whether or not the device token of the communication terminal 50_1 is registered therein. Then, the notification control unit 11 may receive, from the PUSH Proxy server 30, a response about the checking as to whether or not the device token of the communication terminal 50_1 is registered therein, and thereby determine whether or not the device token of the communication terminal 50_1 is registered therein.

Alternatively, the notification control unit 11 may connect to the PUSH Proxy server 30 and check whether or not the device token of the communication terminal 50_1 is registered in the PUSH Proxy server 30. Alternatively, the notification control unit 11 may transmit the PBX-id of the telephony server 10 and the device token of the communication terminal 50_1 to the PUSH proxy server 30, and make the PUSH Proxy server 30 register the device token of the communication terminal 50_1 when the information is not registered therein.

When the device token of the communication terminal 50_1 is not registered in the PUSH Proxy server 30, the notification control unit 11 determines that the Endpoint registration needs to be made, and therefore makes the PUSH Proxy server 30 register the device token of the communication terminal 50_1 therein.

Specifically, the notification control unit 11 transmits an Endpoint registration request message including the PBX-id of the telephony server 10 and the device token of the communication terminal 50_1 to the PUSH Proxy server 30. Then, the notification control unit 11 makes the PUSH Proxy server 30 associate the PBX-id of the telephony server 10 with the device token of the communication terminal 50_1 and register them therein. Note that the notification control unit 11 may connect to the PUSH Proxy server 30, and associate the PBX-id of the telephony server 10 with the device token of the communication terminal 50_1 and register them therein.

On the other hand, when the device token of the communication terminal 50_1 is already registered in the PUSH Proxy server 30, the notification control unit 11 determines that the Endpoint registration is unnecessary and does not make the PUSH Proxy server 30 register the device token of the communication terminal 50_1 therein. That is, the notification control unit 11 does not transmit the Endpoint registration request message including the PBX-id of the telephony server 10 and the device token of the communication terminal 50_1 to the PUSH Proxy server 30.

Further, the notification control unit 11 requests, when the telephony server 10 enters an operating state, the PUSH Proxy server 30 to transmit a notification for making the VoIP application for which the Endpoint registration is made in the PUSH Proxy server 30 register the VoIP application in the telephony server 10.

Specifically, the notification control unit 11 transmits a REGISTER broadcast notification request message including the PBX-id of the telephony server 10 to the PUSH Proxy server 30. The REGISTER broadcast notification request message is a message for requesting a notification for making the VoIP application for which the Endpoint registration is made in the PUSH Proxy server 30 register the VoIP application in the telephony server 10. That is, the REGISTER broadcast notification request is a message for making the Endpoint-registered VoIP application re-register the VoIP application in the primary telephony server 10 (i.e., make a re-registration). Further, the REGISTER broadcast notification request message is a message requesting to simultaneously notify VoIP applications for each of which the Endpoint registration is made in the PUSH Proxy server 30 of the PUSH notification. Note that the REGISTER broadcast notification request message may be a message requesting to simultaneously notify a predetermined number of communication terminals of the PUSH notification at a time in consideration of the processing loads on the telephony server 10 and the PUSH Proxy server 30.

The notification control unit 11 may determine, when a failure occurs in the telephony server 20, which is configured to be redundant with the telephony server 10 and has been operating as the primary telephony server, and hence the telephony server 10 changes to the primary telephony server, that the telephony server 10 has entered an operating state. Alternatively, the notification control unit 11 may determine, when the telephony server 10 restarts and starts as the active exchange after the restart, that the telephony server 10 has entered an operating state. Alternatively, the notification control unit 11 may determine, when the telephony server 10 is operating as the primary telephony server and the terminal control unit 12 (which will be described later) restarts, that the telephony server 10 has entered an operating state.

Note that the later-described call processing control unit 13 may determine whether or not one of the above-described conditions is satisfied, and the call processing control unit 13 may notify the notification control unit 11 that one of the above-described conditions is satisfied. Then, the notification control unit 11 may determine whether or not the telephony server 10 has entered an operating state based on the notification sent from the call processing control unit 13. Alternatively, the notification control unit 11 may determine whether or not one of the above-described conditions is satisfied and determine whether or not the telephony server 10 has entered an operating state.

For example, assume that Endpoint registrations for the VoIP applications 51_1 and 51_2 are already made in the PUSH Proxy server 30. In this case, the PBX-id of the telephony server 10 and the device token of the communication terminal 50_1 are associated with each other and registered in the PUSH Proxy server 30. Similarly, the PBX-id of the telephony server 10 and the device token of the communication terminal 50_2 are associated with each other and registered in the PUSH Proxy server 30.

It is assumed that in this state, the telephony server 20 has been operated as the primary telephony server and a failure occurs in the telephony server 20, and therefore the telephony server 10 changes to the primary telephony server. As a result, the notification control unit 11 determines that the telephony server 10 has changed to the primary telephony server (i.e., has entered an operating state). Then, the notification control unit 11 transmits a REGISTER broadcast notification request message including the PBX-id of the telephony server 10 to the PUSH Proxy server 30.

Note that when the PUSH Proxy server 30 receives the REGISTER broadcast notification message, it acquires the device token associated with the PBX-id included in the REGISTER broadcast notification message. That is, the PUSH Proxy server 30 acquires the device tokens of the communication terminals 50_1 and 50_2.

The PUSH Proxy server 30 transmits, to the PUSH service server 40, a PUSH notification request which is a request to perform a PUSH notification for the communication terminals 50_1 and 50_2 corresponding to the acquired device tokens. The PUSH Proxy server 30 transmits the PUSH notification request including the acquired device tokens to the PUSH service server 40. That is, the PUSH Proxy server 30 transmits the PUSH notification request including the device tokens of the communication terminals 50_1 and 50_2 to the PUSH service server 40. Then, when the PUSH service server 40 receives the PUSH notification request, it performs the PUSH notification for the communication terminals having the device tokens included in the PUSH notification request. When the PUSH notification is one that results from the REGISTER broadcast notification message, the PUSH service server 40 transmits a PUSH notification for requesting a re-registration.

The terminal control unit 12 corresponds to the terminal control unit 3 according to the first example embodiment. The terminal control unit 12 registers the VoIP applications 51_1 and 51_2 in the telephony server 10. The terminal control unit 12 receives a registration request message including the device token of the communication terminal 50_1 from the VoIP application 51_1 and registers the received device token of the communication terminal 50_1 in the telephony server 10. Similarly, the terminal control unit 12 receives a registration request message including the device token of the communication terminal 50_2 from the VoIP application 51_2 and registers the received device token of the communication terminal 50_2 in the telephony server 10.

Specifically, the terminal control unit 12 receives, from the VoIP applications 51_1 and 51_2, a registration request message(s) including the device tokens of the communication terminals 50_1 and 50_2 and extension numbers assigned to the VoIP applications 51_1 and 51_2. Then, the terminal control unit 12 associates the device token of the communication terminal 50_1 with the extension number assigned to the VoIP application 51_1 and registers them. Similarly, the terminal control unit 12 associates the device token of the communication terminal 50_2 with the extension number assigned to the VoIP application 51_2 and registers them.

The call processing control unit 13 controls processing related to a call such as an outgoing call, an incoming call, and a telephone conversation. The call processing control unit 13 performs call control, for example, for calls between an outside telephone set (not shown) and the VoIP applications 51_1 and 51_2. The call processing control unit 13 performs call control, for example, for a call between the VoIP application 51_1 and 51_2.

Note that the call processing control unit 13 may detect that a failure has occurred in the telephony server 20 operating as the primary telephony server and the telephony server 10 has changed to the primary telephony server. Alternatively, the call processing control unit 13 may detect that the telephony server 10 restarts when it is operating as the primary telephony server and starts as the active exchange after the restart. Alternatively, the call processing control unit 13 may detect that the terminal control unit 12 has restarted when the telephony server 10 is operating as the primary telephony server. Then, the call processing control unit 13 may notify the notification control unit 11 of what it has detected.

Example of Operation of Communication System

Figure 3:
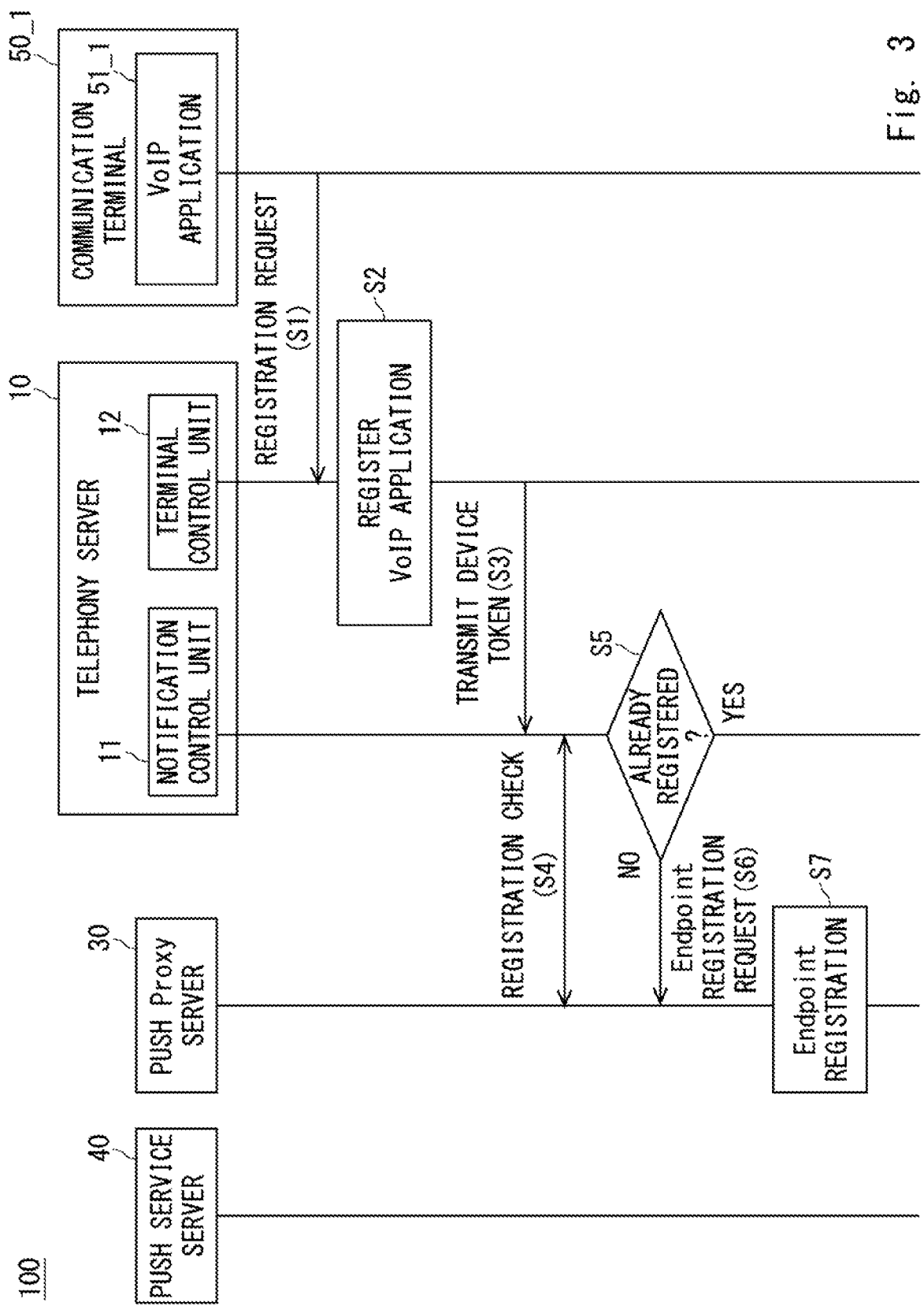
FIG. 3 is a diagram for explaining an example of operations performed by a communication system according to the second example embodiment.
Figure 4:
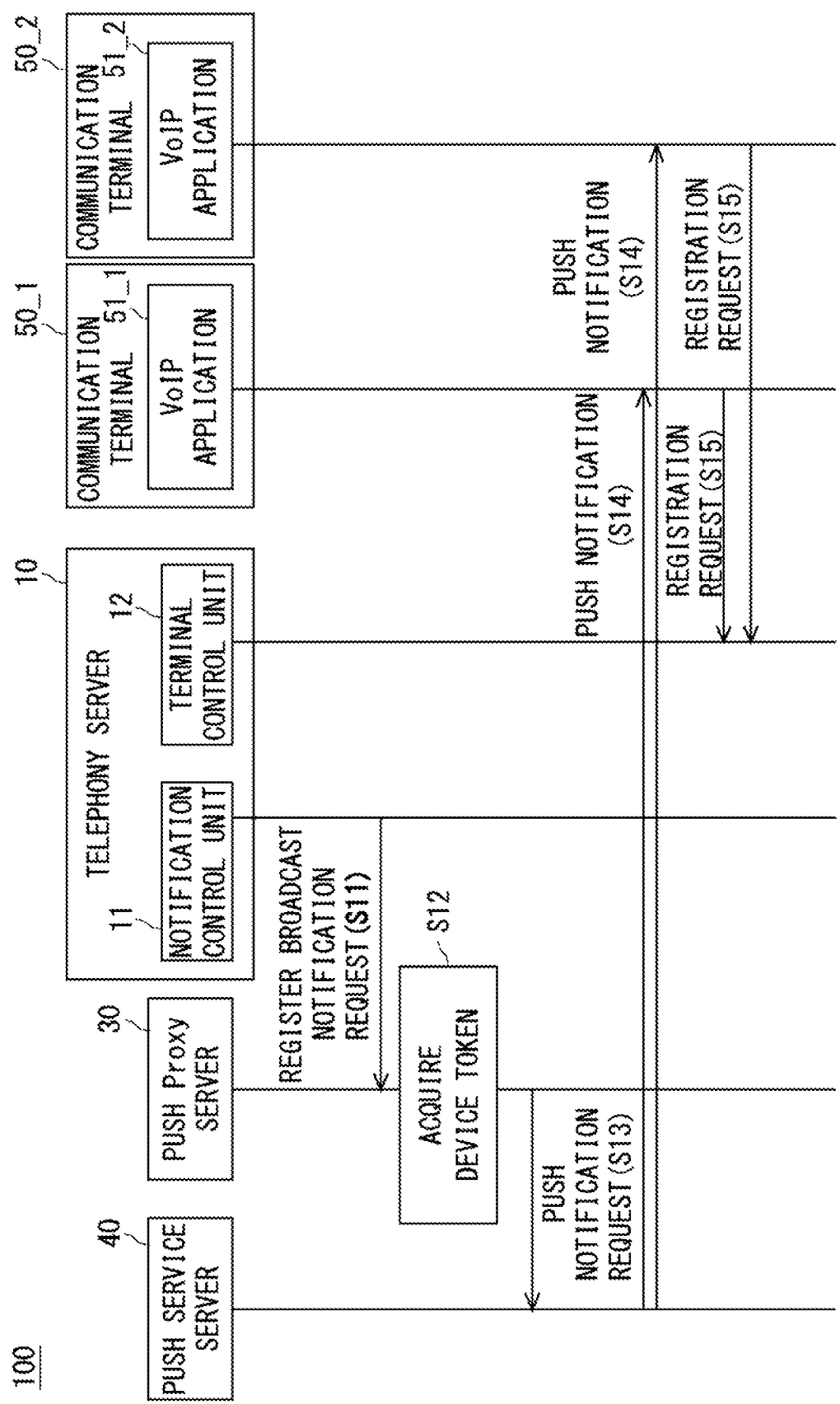
FIG. 4 is a diagram for explaining an example of operations performed by the communication system according to the second example embodiment.

Next, an example of operations performed by the communication system 100 according to the second example embodiment will be described with reference to FIGS. 3 and 4. FIGS. 3 and 4 are diagrams for explaining an example of operations performed by a communication system according to the second example embodiment. Note that the following description with reference to FIGS. 3 and 4 is given by using the telephony server 10 on the assumption that the telephony server 10 operates as the primary telephony server. When the telephony server 20 operates as the primary telephony server, the telephony server 20 performs operations shown in FIGS. 3 and 4.

Firstly, an example of operations that are performed when a registration request message is transmitted from a VoIP application will be described with reference to FIG. 3. FIG. 3 is a diagram for explaining a case where a registration request message is transmitted from the VoIP application 51_1. Note that similar operations are performed when a registration request message is transmitted from the VoIP application 51_2. Further, similar operations are also performed for each of the VoIP applications 51_1 and 51_2 when a registration request message is transmitted from each of the VoIP applications 51_1 and 51_2.

Firstly, the VoIP application 51_1 transmits a registration request message to the terminal control unit 12 (step S1). When the VoIP application 51_1 is installed in the communication terminal 50_1 for the first time, the VoIP application 51_1 transmits a registration request message to the terminal control unit 12. Alternatively, when the PUSH service server 40 transmits a PUSH notification for requesting a re-registration to the VoIP application 51_1, the VoIP application 51_1 transmits a registration request message to the terminal control unit 12. The registration request message may be, for example, a REGISTER message, which is an SIP message. The registration request message includes a device token of the communication terminal 50_1 and an extension number assigned to the VoIP application 51_1.

Next, upon receiving the registration request message, the terminal control unit 12 registers the VoIP application 51_1 in the telephony server 10 (step S2). The terminal control unit 12 associates the device token of the communication terminal 50_1 included in the registration request message with the extension number assigned to the VoIP application 51_1 included therein and registers them in the telephony server 10.

Next, the terminal control unit 12 transmits the device token of the communication terminal 50_1 to the notification control unit 11 (step S3).

Next, the notification control unit 11 checks whether or not the device token of the communication terminal 50_1 acquired in the step S3 is already registered in the PUSH Proxy server 30 (step S4). The notification control unit 11 checks whether the device token of the communication terminal 50_1 is registered in the PUSH Proxy server 30 in order to determine whether or not the Endpoint registration for the VoIP application 51_1 needs to be made.

The notification control unit 11 transmits the PBX-id of the telephony server 10 and the device token of the communication terminal 50_1 to the PUSH Proxy server 30 and thereby requests the PUSH Proxy server 30 to check whether or not the device token of the communication terminal 50_1 is registered. Then, the notification control unit 11 may receive, from the PUSH Proxy server 30, a response about the checking as to whether or not the device token of the communication terminal 50_1 is registered. Alternatively, the notification control unit 11 may connect to the PUSH Proxy server 30 and check whether or not the device token of the communication terminal 50_1 is registered in the PUSH Proxy server 30.

Next, the notification control unit 11 determines whether or not the device token of the communication terminal 50_1 is registered in the PUSH Proxy server 30 based on a result of the checking performed in the step S4 (step S5).

When the device token of the communication terminal 50_1 is registered in the PUSH Proxy server 30 (Yes at step S5), the notification control unit 11 determines that the Endpoint registration is already made and finishes the process.

On the other hand, when the device token of the communication terminal 50_1 is not registered in the PUSH Proxy server 30 (No at step S5), the notification control unit 11 transmits an Endpoint registration request message to the PUSH Proxy server 30 (step S6).

The notification control unit 11 incorporates the PBX-id of the telephony server 10 and the device token of the communication terminal 50_1 into the Endpoint registration request message and transmits the Endpoint registration request message to the PUSH Proxy server 30.

Next, when the PUSH Proxy server 30 receives the Endpoint registration request message, it makes the Endpoint registration (step S7). Specifically, the PUSH Proxy server 30 associates the PBX-id of the telephony server 10 included in the Endpoint registration request message with the device token of the communication terminal 50_1 included therein and registers them. Note that the notification control unit 11 may connect to the PUSH Proxy server 30, and associate the PBX-id of the telephony server 10 with the device token of the communication terminal 50_1 and register them therein.

Next, an example of operations that are performed when the telephony server 10 enters an operating state will be described with reference to FIG. 4. FIG. 4 is a diagram showing a sequence that is performed when the telephony server 20 has operated as the primary telephony server and a failure occurs in the telephony server 20, and therefore the telephony server 10 changes to the primary telephony server. Further, FIG. 4 is a diagram showing a sequence that is performed when the telephony server 10 restarts and starts as the primary telephony server after the restart. Further, FIG. 4 is a diagram showing a sequence that is performed when the telephony server 10 is operating as the primary telephony server and the terminal control unit 12 restarts.

The following description is given on the assumption that Endpoint registrations for the VoIP applications 51_1 and 51_2 are already made in the PUSH Proxy server 30. That is, the PBX-id of the telephony server 10 and the device token of the communication terminal 50_1 are associated with each other and registered in the PUSH Proxy server 30. Further, the PBX-id of the telephony server 10 and the device token of the communication terminal 50_2 are associated with each other and registered in the PUSH Proxy server 30.

When the telephony server 10 enters an operating state, the notification control unit 11 transmits a REGISTER broadcast notification request message including the PBX-id of the telephony server 10 to the PUSH Proxy server 30 (step S11).

Next, the PUSH Proxy server 30 acquires the device token registered in association with the PBX-id of the telephony server 10 included in the REGISTER broadcast notification request message (step S12). The PBX-id of the telephony server 10 and the device tokens of the communication terminals 50_1 and 50_2 are associated with each other and registered in the PUSH Proxy server 30. Therefore, the PUSH Proxy server 30 acquires the device tokens of the communication terminals 50_1 and 50_2.

Next, the PUSH Proxy server 30 incorporates the device tokens of the communication terminals 50_1 and 50_2 into the PUSH notification request and transmits the PUSH notification request to the PUSH service server 40 (step S13).

Next, the PUSH service server 40 receives the PUSH notification request and makes a PUSH notification for the communication terminals having the device tokens included in the PUSH notification request (step S14). Since the device tokens of the communication terminals 50_1 and 50_2 are included in the PUSH notification request, the PUSH service server 40 acquires the device tokens of the communication terminals 50_1 and 50_2. Then, the PUSH service server 40 transmits the PUSH notification for requesting a re-registration to the communication terminals 50_1 and 50_2. The PUSH service server 40 simultaneously transmits the PUSH notification to the communication terminals corresponding to the acquired device tokens. That is, the PUSH service server 40 broadcasts the PUSH notification to the communication terminals corresponding to the acquired device tokens.

When the communication terminals 50_1 and 50_2 receive the PUSH notification, they notify the VoIP applications 51_1 and 51_2 of the reception thereof. Further, the VoIP applications 51_1 and 51_2 make a registration request to the terminal control unit 12 (step S15).

When the communication terminals 50_1 and 50_2 receive the PUSH notification but one of the VoIP applications 51_1 and 51_2 is in a sleep state, they make the VoIP application in the sleep state enter an active state. As a result, both of the VoIP applications 51_1 and 51_2 become an active state, so that they transmit registration request messages to the terminal control unit 12 of the telephony server 10 based on the content of the PUSH notification. The registration request message may be REGISTER of the SIP. The VoIP application 51_1 transmits a registration request message including the device token of the communication terminal 50_1, and the VoIP application 51_2 transmits a registration request message including the device token of the communication terminal 50_2. Note that after that, the operations shown in FIG. 3 are performed in the communication system 100.

As described above, the telephony servers 10 and 20 transmit a REGISTER broadcast notification request message to the PUSH Proxy server 30 when the telephony servers themselves enter an operating state. Then, the telephony servers 10 and 20 register the VoIP applications 51_1 and 51_2, for which Endpoint registrations are made, in the telephony servers themselves. A PUSH notification resulting from the REGISTER broadcast notification request message is a PUSH notification by which both of the VoIP applications 51_1 and 51_2 are made to enter an active state even when one of them is in a sleep state. That is, the telephony servers 10 and 20 make a VoIP application in a sleep state enter an active state and perform a registration process in the telephony servers themselves without requiring an operation performed by a user, so that they can correctly make a notification of an incoming call. Therefore, by using the telephony servers 10 and 20 according to the second example embodiment, it is possible to, when a failure occurs, prevent a service from deteriorating without requiring an operation performed by a user.

Further, when the VoIP applications 51_1 and 51_2 are installed in the communication terminals 50_1 and 50_2 for the first time, the telephony servers 10 and 20 request the PUSH Proxy server 30 to make Endpoint registrations for them. The PUSH Proxy server 30 registers the device tokens of the communication terminals 50_1 and 50_2 and manages the VoIP applications through which services of the telephony servers 10 and 20 are provided. That is, the telephony servers 10 and 20 and the PUSH Proxy server 30 manage VoIP applications through which services of the telephony servers 10 and 20 are provided. Therefore, for example, even when a failure occurs in both the telephony servers 10 and 20, it is possible to restore a service state based on information of the VoIP applications which are managed by the PUSH Proxy server 30 and through which services are provided. Therefore, according to the communication system 100 in accordance with the second example embodiment, even when a failure occurs in both of the telephony servers 10 and 20, the service state can be restored.

Modified Example

The following modifications may be made to the above-described second example embodiment.

<1> In addition to the PBX-id of the telephony server 10 and the device tokens of the communication terminals 50_1 and 50_2, identification information for identifying the VoIP applications 51_1 and 51_2 may be further used as the Endpoint registration. The identification information may be an application ID.

In this case, the telephony servers 10 and 20 may store application IDs of the VoIP applications 51_1 and 51_2 in advance. Alternatively, the VoIP applications 51_1 and 51_2 may incorporate their application IDs in the registration request message and transmit the registration request message. Then, the telephony servers 10 and 20 acquire the application IDs incorporated by the VoIP applications 51_1 and 51_2 included in the registration request message from the registration request message.

Further, when the telephony servers 10 and 20 determine whether or not Endpoint registrations need to be made, they may further use the application IDs of the VoIP applications 51_1 and 51_2 for the determination. That is, the telephony servers 10 and 20 may determine whether the PBX-ids, the device tokens, and the application IDs are registered in the PUSH Proxy server 30.

Further, the telephony servers 10 and 20 incorporate the PBX-ids, the device tokens, and the application IDs into the Endpoint registration request message and transmit the Endpoint registration request message to the PUSH Proxy server 30. The PUSH Proxy server 30 may associate the PBX-ids, the device tokens, and the application IDs included in the Endpoint registration request message with one another, and register them.

Even in this way, effects similar to those in the above-described example embodiment can be achieved. Further, by adopting such a configuration, for example, in the case where the telephony server 10 provides a plurality of services and there are a plurality of applications corresponding to the provided services, it is possible to manage and identify the applications corresponding to the respective services.

<2> In the above-described second example embodiment, the registration request message at the time of the initial registration is the same as that at the time of the re-registration. For example, a message type may be included in the registration request message, so that the registration request messages at the time of the initial registration may be distinguished from that at the time of the re-registration.

In this case, the telephony servers 10 and 20 determine, from the message type included in the registration request message, whether or not an Endpoint registration is already made for a VoIP application installed in a communication terminal from which the registration request message has been transmitted. Further, the telephony servers 10 and 20 do not need to request the PUSH Proxy server 30 to check whether or not the Endpoint registration is already made for a VoIP application installed in the communication terminal from which the registration request message has been transmitted.

<3> In the above-described second example embodiment, the telephony servers 10 and 20 may determine whether or not an Endpoint registration is already made based on whether or not the registration request message is received within a predetermined time after the transmission of the REGISTER broadcast notification request message. In this case, the telephony servers 10 and 20 do not need to request the PUSH Proxy server 30 to check whether or not the Endpoint registration is already made for a VoIP application in a communication terminal from which the registration request message has been transmitted.

Other Example Embodiment

Figure 5:
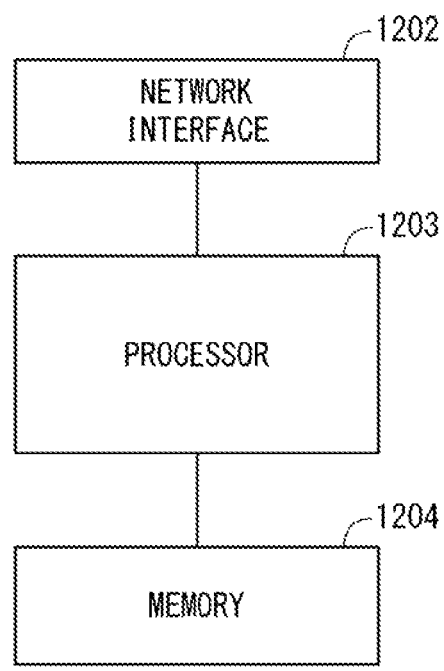
FIG. 5 is a block diagram showing an example of a hardware configuration of an exchange or the like according to each example embodiment of the present disclosure.

As shown in FIG. 5, each of the exchange 1 and the telephony servers 10 and 20 (hereinafter referred to as the exchange 1 or the like) described in the above example embodiment may have the following hardware configuration. FIG. 5 is a block diagram showing an example of a hardware configuration of an exchange or the like according to each example embodiment of the present disclosure.

As shown in FIG. 5, the exchange 1 or the like includes a processor 1202 and a memory 1203.

The processor 1202 may load software (a computer program) from the memory 1203 and execute the loaded software, thereby performing the operations (the processes) of the exchange 1 or the like described by using the flowchart in the above-described embodiments. The processor 1202 may be, for example, a microprocessor, an MPU (Micro Processing Unit), or a CPU (Central Processing Unit). The processor 1202 may include a plurality of processors.

The memory 1203 is formed by a combination of a volatile memory and a nonvolatile memory. The memory 1203 may include a storage located remotely from the processor 1202. In this case, the processor 1202 may access the memory 1203 through an I/O interface (not shown).

In the example shown in FIG. 5, the memory 1203 is used to store a group of software modules. The processor 1202 may load the group of software modules from the memory 1203 and execute the loaded software module, thereby performing the operations (the processes) of the exchange 1 or the like described in the above-described embodiments.

As described above with reference to FIG. 5, each of the processors included in the exchange 1 or the like executes one or a plurality of programs including a group of instructions for causing a computer to perform the algorithm described above with reference to the drawings.

In the above-described examples, the program may be stored in various types of non-transitory computer readable media and thereby supplied to the computer. The non-transitory computer readable media includes various types of tangible storage media. Examples of the non-transitory computer readable media include a magnetic recording medium (such as a flexible disk, a magnetic tape, and a hard disk drive) and a magneto-optic recording medium (such as a magneto-optic disk). Further, examples of the non-transitory computer readable media include CD-ROM (Read Only Memory), CD-R, and CD-R/W. Further, examples of the non-transitory computer readable media include a semiconductor memory. The semiconductor memory includes, for example, a mask ROM, a PROM (Programmable ROM), an EPROM (Erasable PROM), a flash ROM, and a RAM (Random Access Memory). These programs may be supplied to the computer by using various types of transitory computer readable media. Examples of the transitory computer readable media include an electrical signal, an optical signal, and an electromagnetic wave. The transitory computer readable media can be used to supply programs to the computer through a wired communication line (e.g., electric wires and optical fibers) or a wireless communication line.

Note that the present disclosure is not limited to the above-described embodiments and can be modified as appropriate without departing from the scope and spirit of the disclosure. Further, the present disclosure may be implemented by combining those example embodiments as appropriate.

Further, the whole or part of the embodiments disclosed above can be described as, but not limited to, the following supplementary notes.

(Supplementary Note 1)

An Exchange Comprising:

a notification control unit configured to, when the exchange enters an operating state, request a server apparatus to transmit a notification for making a predetermined application installed in a communication terminal registered in the server apparatus register the application in the exchange; and a terminal control unit configured to register the predetermined application in the exchange.

(Supplementary Note 2)

The exchange described in Supplementary note 1, wherein the notification control unit transmits a notification request message including first identification information for identifying the exchange to the server apparatus, and the terminal control unit receives a first registration request message including second identification information for identifying the communication terminal from the predetermined application and registers the second identification information in the exchange.

(Supplementary Note 3)

The exchange described in Supplementary note 2, wherein when the first registration request message is received, the notification control unit determines whether or not the second identification information is registered in the server apparatus, and when the second identification information is not registered in the server apparatus, transmits a second registration request message including the first identification information and the second identification information to the server apparatus.

(Supplementary Note 4)

The exchange described in Supplementary note 3, wherein the notification control unit transmits the second registration request message further including third identification information for identifying the predetermined application to the server apparatus.

(Supplementary Note 5)

The exchange described in any one of Supplementary notes 2 to 4, wherein when the first registration request message is received, the notification control unit determines whether or not the second identification information is registered in the server apparatus, and when the second identification information is registered in the server apparatus, the notification control unit does not transmit a second registration request message including the first identification information and the second identification information to the server apparatus.

(Supplementary Note 6)

The exchange described in any one of Supplementary notes 2 to 5, wherein the first identification information is the same information as that of another exchange configured to be redundant with the exchange.

(Supplementary Note 7)

The exchange described in any one of supplementary notes 2 to 6, wherein the second identification information is a device token.

(Supplementary Note 8)

The exchange described in any one of Supplementary notes 1 to 7, wherein when one of a condition that a failure occurs in another exchange operating as an active exchange and the exchange changes to the active exchange, a condition that the exchange restarts and starts as the active exchange, and a condition that the exchange is operating as the active exchange and the terminal control unit restarts is satisfied, the notification control unit determines that the exchange has entered an operating state and requests the server apparatus to transmit the notification, the another exchange being configured to be redundant with the exchange.

(Supplementary Note 9)

The exchange described in any one of Supplementary notes 1 to 8, wherein the request is a request to broadcast a notification indicating simultaneous notifications for the predetermined application.

(Supplementary Note 10)

The exchange described in any one of Supplementary notes 1 to 9, wherein the notification is a PUSH notification capable of starting the predetermined application in a sleep state.

(Supplementary Note 11)

The exchange described in any one of Supplementary notes 1 to 10, wherein the predetermined application is a VoIP (Voice Over IP (Internet Protocol)) application.

(Supplementary Note 12)

A communication system comprising:

the exchange described in any one of Supplementary notes 1 to 11; and a server apparatus configured to make the notification to the predetermined application through another server apparatus in response to a request from the exchange.

(Supplementary Note 13)

A registration method comprising:

requesting, when an own exchange enters an operating state, a server apparatus to transmit a notification for making a predetermined application installed in a communication terminal registered in the server apparatus register the application in the own exchange; and registering the predetermined application in the own exchange.

(Supplementary Note 14)

The registration method described in Supplementary note 13, wherein a notification request message including first identification information for identifying the own exchange is transmitted to the server apparatus;

a first registration request message including second identification information for identifying the communication terminal is received from the predetermined application; and the second identification information is registered in the own exchange.

(Supplementary Note 15)

The registration method described in Supplementary note 14, wherein when the first registration request message is received, it is determined whether or not the second identification information is registered in the server apparatus; and when the second identification information is not registered in the server apparatus, a second registration request message including the first identification information and the second identification information is transmitted to the server apparatus.

(Supplementary Note 16)

The registration method described in Supplementary note 15, wherein the second registration request message further including third identification information for identifying the predetermined application is transmitted to the server apparatus.

(Supplementary Note 17)

The registration method described in any one of Supplementary notes 14 to 16, wherein when the first registration request message is received, it is determined whether or not the second identification information is registered in the server apparatus; and when the second identification information is registered in the server apparatus, a second registration request message including the first identification information and the second identification information is not transmitted to the server apparatus.

(Supplementary Note 18)

The registration method described in any one of Supplementary notes 14 to 17, wherein the first identification information is the same information as that of another exchange configured to be redundant with the own exchange.

(Supplementary Note 19)

The registration method described in any one of Supplementary notes 14 to 18, wherein the second identification information is a device token.

(Supplementary Note 20)

The registration method described in any one of Supplementary notes 13 to 19, wherein when one of a condition that a failure occurs in another exchange operating as an active exchange and the own exchange changes to the active exchange, a condition that the own exchange restarts and starts as the active exchange, and a condition that the own exchange is operating as the active exchange is satisfied, it is determined that the own exchange has entered an operating state and the server apparatus is requested to transmit the notification, the another exchange being configured to be redundant with the own exchange.

(Supplementary Note 21)

The registration method described in any one of Supplementary notes 13 to 20, wherein the request is a request to broadcast a notification indicating simultaneous notifications for the predetermined application.

(Supplementary Note 22)

The registration method described in any one of Supplementary notes 13 to 21, wherein the notification is a PUSH notification capable of starting the predetermined application in a sleep state.

(Supplementary Note 23)

The registration method described in any one of Supplementary notes 13 to 22, wherein the predetermined application is a VoIP (Voice Over IP (Internet Protocol)) application.

(Supplementary Note 24)

A program for causing a computer to execute a registration method described in any one of Supplementary notes 13 to 23.

(Supplementary Note 25)

A registration program for causing a computer to:

request, when an exchange enters an operating state, a server apparatus to transmit a notification for making a predetermined application installed in a communication terminal registered in the server apparatus register the application in the own exchange; and register the predetermined application in the exchange.

(Supplementary Note 26)

A communication system comprising:

an exchange, and a server apparatus, wherein the exchange requests, when the exchange enters an operating state, a server apparatus to transmit a notification for making a predetermined application installed in a communication terminal registered in the server apparatus register the application in the exchange, and registers the predetermined application in the exchange, and the server apparatus makes the notification to the predetermined application through another server apparatus in response to a request from the exchange.

(Supplementary Note 27)

The communication system described in Supplementary note 26, wherein the exchange transmits a notification request message including first identification information for identifying the exchange, and the exchange receives a registration request message including second identification information for identifying the communication terminal and registers the second identification information in the exchange.

(Supplementary Note 28)

The communication system described in Supplementary note 26 or 27, wherein the notification is a PUSH notification capable of starting the predetermined application in a sleep state.

REFERENCE SIGNS LIST

1 EXCHANGE
2, 11, 21 NOTIFICATION CONTROL UNITS
3, 12, 22 TERMINAL CONTROL UNITS
10, 20 TELEPHONY SERVERS
13, 23 CALL PROCESSING CONTROL UNITS
30 PUSH Proxy SERVER
40 PUSH SERVICE SERVER
50_1, 50_2 COMMUNICATION TERMINAL
51_1, 51_2 VoIP APPLICATIONS
100 COMMUNICATION SYSTEM

The invention claimed is:

1. An exchange comprising:
a memory having program instructions stored therein; and
one or more processors configured to process the program instructions that when executed implement,
a notification control unit configured to, when the exchange enters an operating state, transmit a notification request message including first identification information for identifying the exchange to a server apparatus, and request the server apparatus to transmit a notification for making a predetermined application installed in a communication terminal registered in the server apparatus register the predetermined application in the exchange; and
a terminal control unit configured to receive a first registration request message including second identification information for identifying the communication terminal from the predetermined application, register the second identification information in the exchange, and register the predetermined application in the exchange,
wherein when the first registration request message is received, the notification control unit determines whether or not the second identification information is registered in the server apparatus, and when the second identification information is not registered in the server apparatus, the notification control unit transmits a second registration request message including the first identification information and the second identification information to the server apparatus.

2. The exchange according to claim 1, wherein the notification control unit transmits the second registration request message further including third identification information for identifying the predetermined application to the server apparatus.

3. The exchange according to claim 1, wherein when the first registration request message is received, the notification control unit determines whether or not the second identification information is registered in the server apparatus, and when the second identification information is registered in the server apparatus, the notification control unit does not transmit the second registration request message including the first identification information and the second identification information to the server apparatus.

4. The exchange according to claim 1, wherein the first identification information is the same information as that of another exchange configured to be redundant with the exchange.

5. The exchange according to claim 1, wherein the second identification information is a device token.

6. The exchange according to claim 1, wherein when one of a condition that a failure occurs in another exchange operating as an active exchange and the exchange changes to the active exchange, a condition that the exchange restarts and starts as the active exchange, and a condition that the exchange is operating as the active exchange and the terminal control unit restarts is satisfied, the notification control unit determines that the exchange has entered an operating state and requests the server apparatus to transmit the notification, the another exchange being configured to be redundant with the exchange.

7. The exchange according to claim 1, wherein the notification is a broadcast notification to be broadcasted to the predetermined application.

8. The exchange according to claim 1, wherein the notification is a PUSH notification capable of starting the predetermined application in a sleep state.

9. The exchange according to claim 1, wherein the predetermined application is a VoIP (Voice Over IP (Internet Protocol)) application.

10. A non-transitory computer-readable medium storing a program for causing a computer to function as the exchange according to claim 1.

11. A communication system comprising:
the exchange according to claim 1; and
a server configured to make the notification to the predetermined application through another server in response to a request from the exchange.

12. A registration method for an exchange, comprising:
when the exchange enters an operating state, transmitting a notification request message including first identification information for identifying the exchange to a server apparatus, and requesting the server apparatus to transmit a notification for making a predetermined application installed in a communication terminal registered in the server apparatus register the predetermined application in the exchange; and
receiving a first registration request message including second identification information for identifying the communication terminal from the predetermined application, registering the second identification information in the exchange, and registering the predetermined application in the exchange,
wherein when the first registration request message is received, determining whether or not the second identification information is registered in the server apparatus, and when the second identification information is not registered in the server apparatus, the notification control unit transmits a second registration request message including the first identification information and the second identification information to the server apparatus.

* * * * *